(12) United States Patent
Linde et al.

(10) Patent No.: US 12,234,099 B2
(45) Date of Patent: Feb. 25, 2025

(54) CROP UNLOADER DRIVE WITH TENSIONER

(71) Applicant: CNH Industrial America LLC, New Holland, PA (US)

(72) Inventors: Karl R. Linde, Leola, PA (US); Michael Rush, Lancaster, PA (US)

(73) Assignee: CNH Industrial America LLC, New Holland, PA (US)

(*) Notice: Subject to any disclaimer, the term of this patent is extended or adjusted under 35 U.S.C. 154(b) by 680 days.

(21) Appl. No.: 17/553,220

(22) Filed: Dec. 16, 2021

(65) Prior Publication Data
US 2023/0192411 A1 Jun. 22, 2023

(51) Int. Cl.
*B65G 41/00* (2006.01)
*A01D 61/00* (2006.01)
*A01D 61/02* (2006.01)
*A01D 61/04* (2006.01)

(52) U.S. Cl.
CPC ......... *B65G 41/002* (2013.01); *A01D 61/008* (2013.01); *A01D 61/02* (2013.01); *A01D 61/04* (2013.01)

(58) Field of Classification Search
CPC ....... B65G 41/002; A01F 12/46; A01D 61/04; A01D 61/02; A01D 61/008; A01D 43/087; A01D 41/1217; A01D 17/02
See application file for complete search history.

(56) References Cited

U.S. PATENT DOCUMENTS

| | | | | |
|---|---|---|---|---|
| 1,374,728 A | * | 4/1921 | Geier | B65G 41/002 198/315 |
| 2,541,984 A | * | 2/1951 | Chandler | B65G 65/46 56/473.5 |
| 2,724,516 A | * | 11/1955 | Weishaar | A01D 41/1208 56/219 |

(Continued)

FOREIGN PATENT DOCUMENTS

| | | | | |
|---|---|---|---|---|
| CN | 106717489 A | * | 5/2017 | A01D 41/00 |
| EP | 1425953 A1 | | 6/2004 | |

(Continued)

OTHER PUBLICATIONS

Extended European Search Report and Written Opinion for EP Application 22213064.3 dated Apr. 14, 2023 (seven pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A crop unloader system comprising: an elevator assembly, a boom assembly, a flexible drive, and a tensioning assembly. The elevator assembly has a frame, an elevator drive and drive motor, and an elevator drive output. The boom assembly has a frame connected to the elevator frame at a boom pivot axis to rotate through a range of motion, and an unloader drive input. The flexible drive is operatively connected between the elevator drive output and the unloader drive input. The tensioning assembly has a tensioner link and a control link that are pivotally to each other and with one of the two links each pivotally connected to one of the boom and elevator frame. An idler wheel is on the tensioner link. The tensioning assembly maintains a tension load on the endless flexible drive within a predetermined range, throughout the range of motion of the boom frame.

18 Claims, 6 Drawing Sheets

(56) References Cited

U.S. PATENT DOCUMENTS

| | | | | | |
|---|---|---|---|---|---|
| RE24,920 E | * | 1/1961 | Palmer | ............. | B60P 1/40 |
| | | | | | 239/674 |
| 3,630,009 A | * | 12/1971 | Ashton | ............. | A01D 45/02 |
| | | | | | 198/570 |
| 3,863,783 A | * | 2/1975 | Spellman, Jr. | ............. | B28C 5/4255 |
| | | | | | 198/312 |
| 4,372,440 A | * | 2/1983 | Ringis | ............. | B65G 23/22 |
| | | | | | 198/816 |
| 5,108,249 A | * | 4/1992 | Kinzenbaw | ............. | B60P 1/38 |
| | | | | | 414/528 |
| 5,518,453 A | * | 5/1996 | Tribbett | ............. | A01D 41/1217 |
| | | | | | 56/10.2 R |
| 5,584,640 A | * | 12/1996 | Johnson | ............. | A01D 41/1217 |
| | | | | | 198/572 |
| 6,042,326 A | | 3/2000 | Thomas et al. | | |
| 9,254,773 B2 | * | 2/2016 | Farley | ............. | B60P 1/42 |
| 9,474,211 B2 | | 10/2016 | Hollatz | | |
| 2007/0191080 A1 | | 8/2007 | Voss et al. | | |
| 2013/0087432 A1 | * | 4/2013 | Priepke | ............. | B65G 39/125 |
| | | | | | 198/716 |
| 2014/0109536 A1 | | 4/2014 | Boeck et al. | | |
| 2015/0344230 A1 | * | 12/2015 | Hollatz | ............. | F16H 7/12 |
| | | | | | 198/814 |
| 2017/0273243 A1 | * | 9/2017 | Bailliu | ............. | A01D 41/142 |

FOREIGN PATENT DOCUMENTS

| | | | | |
|---|---|---|---|---|
| EP | 2653733 A2 | * | 10/2013 | ............. A01D 61/02 |
| EP | 3072383 A1 | * | 9/2016 | ............. A01F 12/46 |
| EP | 3228175 A1 | | 10/2017 | |
| FR | 2503677 A1 | | 10/1982 | |
| JP | 2018201437 A | | 12/2018 | |
| WO | WO-2019165527 A1 | * | 9/2019 | ............. A01D 45/10 |

* cited by examiner

CROP UNLOADER DRIVE WITH TENSIONER

BACKGROUND OF THE INVENTION

A variety of agricultural machines include a conveyor system for transporting crop or other material from one location to another. For example, an agricultural combine typically has an unloader device that is used to unload grain from a grain tank on the combine to an external grain cart or other receptacle. A typical unloader includes a hollow passage containing a crop moving device, such as one or more auger screws or conveyors. Movement of the auger screw or conveyor carries the material along the length of the housing until it is expelled out the end of the housing.

In some cases, an unloader may be fixed in place to the machine housing, but it is common for the unloader to be movable to different orientations. For example, an unloader might be movable to distribute material in different directions (e.g., to different receptacles surrounding the material supply). As another example, an unloader might be movable between a stowed position and an operative position. This latter configuration is typical on agricultural combines, which operate with the unloader in a stowed position during some of the harvesting process, and then move the unloader to the operative position extending laterally from the combine to direct crop material to a support truck or grain cart that is operated alongside the combine. This movable mounting can help protect the unloader when it is not in use, and to allow the equipment to be more maneuverable and to navigate through smaller spaces. Examples of agricultural machines having a movable unloading mechanism are shown in U.S. Pat. Nos. 7,494,409; 6,718,746; 6,638,159; 6,042,326; 5,359,838; and 5,100,281 which are incorporated herein by reference.

This description of the background is provided to assist with an understanding of the following explanations of exemplary embodiments, and is not an admission that any or all of this background information is necessarily prior art.

SUMMARY OF THE INVENTION

In one exemplary aspect, there is provided a crop unloader system comprising and elevator assembly, a boom assembly, an endless flexible drive, and a tensioning assembly. The elevator assembly has an elevator frame, an elevator drive attached to the elevator frame, an elevator drive motor attached to the elevator frame and configured to selectively operate the elevator drive, and an elevator drive output attached to the elevator frame and configured to be driven about an elevator drive output axis by the elevator drive motor. The boom assembly has a boom frame connected to the elevator frame at a boom pivot axis that is parallel with the elevator drive output axis, the boom frame being rotatable about the boom pivot axis relative to the elevator frame through a range of motion between a first angular position and a second angular position, and an unloader drive input attached to the boom frame and configured to rotate about an unloader drive input axis. The endless flexible drive is operatively connected between the elevator drive output and the unloader drive input, The tensioning assembly has a tensioner link pivotally connected to one of the elevator frame and the boom frame at a first tensioner pivot, a control link pivotally connected to the other of the elevator frame and the boom frame at a second tensioner pivot, and pivotally connected to the tensioner link at a third tensioner pivot, the third tensioner pivot being spaced from the first tensioner pivot and the second tensioner pivot, and an idler wheel operatively connected to the tensioner link, and configured to generate a tension load on the endless flexible drive. The tensioning assembly is configured to maintain the tension load on the endless flexible drive within a predetermined range, throughout the range of motion of the boom frame relative to the elevator frame.

In another exemplary aspect, there is provided an agricultural combine comprising a chassis configured for movement on a surface, a threshing and separating system attached to the chassis, a hopper located on the chassis and configured to retain crop material therein, and a crop unloader system as set forth in any of the foregoing aspects and examples.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide unloaders which may be used in agricultural equipment (e.g., combines, grain carts, etc.), or in other environments. However, the invention is not limited to any particular application except as recited in the claims.

Figure 1:
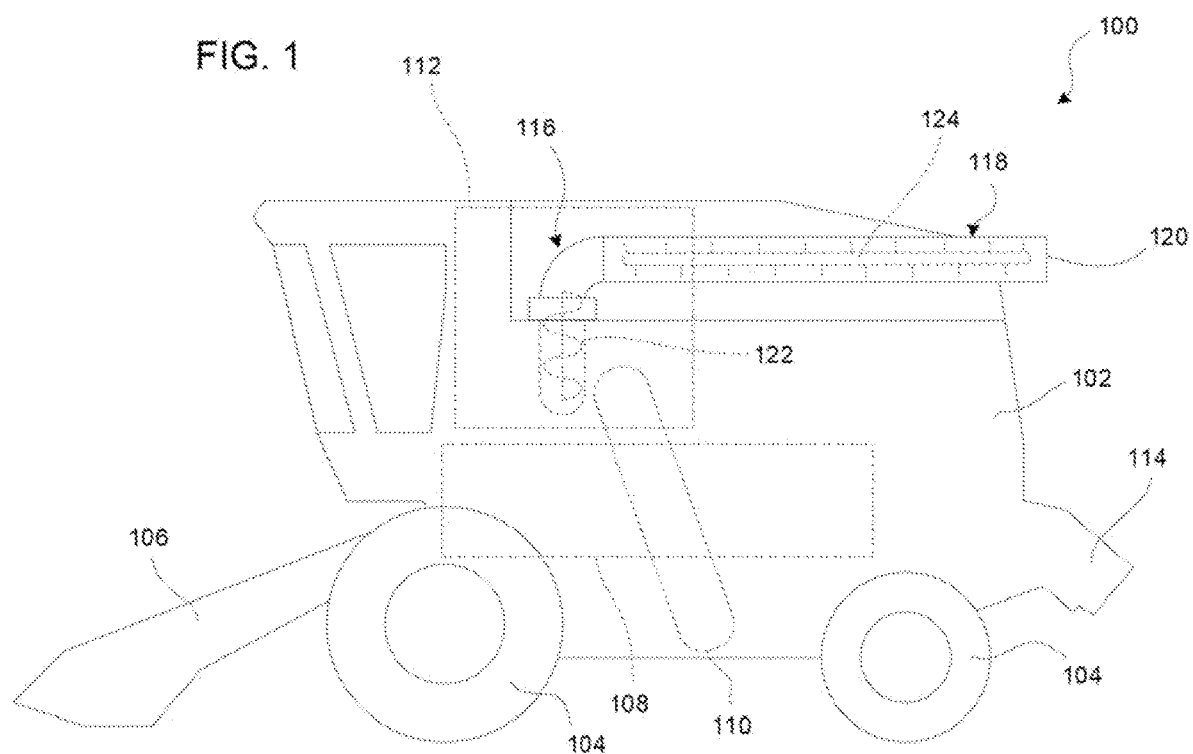
FIG. 1 schematically illustrates a side view of an example of an agricultural combine having a crop unloader system.

Referring to FIG. 1, an example of an agricultural combine 100 is schematically illustrated. The combine 100 includes a chassis 102 that is supported for movement on the ground by wheels 104 (e.g., pneumatic tires or tracked wheels). A header assembly 106 is attached to the combine 100 and configured to receive crop material and convey such material to a threshing and separating system 108 located in or on the chassis 102. The threshing and separating system 108 separates grain from the remaining crop material (also known as "material other than grain" or "MoG") and an auger 110 or the like conveys the grain to a grain hopper 112. The MoG is discharged from the back of the combine through one or more openings, which may include a spreader 114 to better distribute the MoG on the ground.

The combine 100 also includes an unloader system for removing grain from the vehicle 100. The unloader system generally comprises an elevator assembly 116 configured to lift grain from the hopper 112, and a boom assembly 118 configured to receive the grain from the elevator assembly 116 and convey the grain to an outlet 120 for delivery to another location (e.g., a support truck, grain cart or storage bin). To lift the grain, the elevator assembly 116 includes a grain elevator 122, such as an auger (as schematically shown in FIG. 1) or a series of paddles mounted on an endless paddle conveyor belt (see FIG. 7). Similarly, the boom assembly includes an unloader conveyor, such as an unloader conveyor belt 124, that extends from the grain elevator 122 to the outlet 120. The unloader conveyor belt 124 may be surrounded by a chute 126 to help contain and direct the grain to the outlet 120.

Figure 2A:
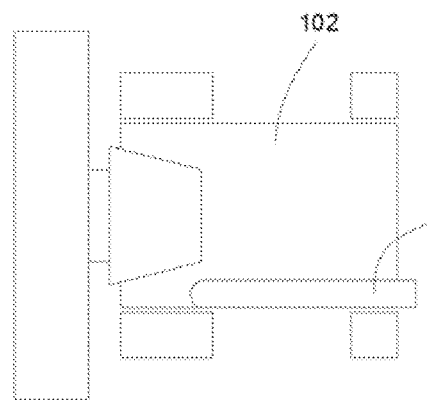
FIGS. 2A and 2B schematically illustrate top views of the combine of FIG. 1, with the crop unloader in a stowed position and an operative position, respectively.
Figure 2B:
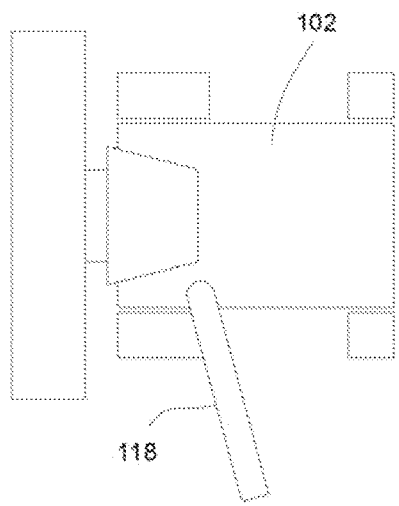

The boom assembly 118 and all or some of the elevator assembly 116 typically are movably mounted to the chassis 102 to rotate about a generally vertical axis, to allow the boom assembly 118 to move relative to the chassis 102 between a stowed position as shown in FIG. 2A, and an unloading position as shown in FIG. 2B. Any suitable arrangement of drive mechanisms may be used to provide this capability, as known in the art.

Figure 3:
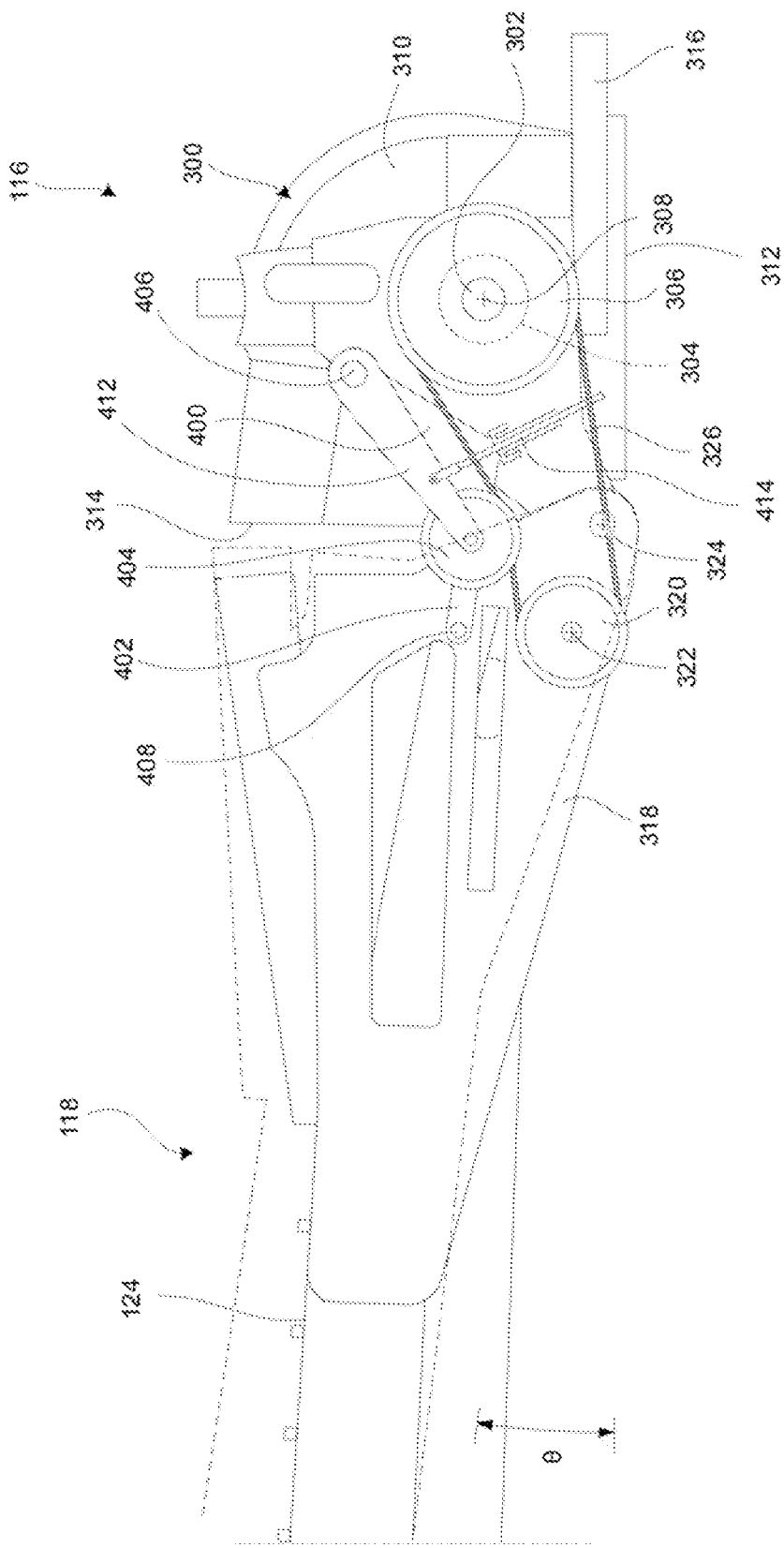
FIG. 3 is a schematic side view of an exemplary embodiment of a crop unloader system.

Referring now to FIG. 3, an example of a crop unloader system is described in greater detail. Here, the elevator assembly 116 comprises an elevator frame 300, an elevator drive 302 attached to the elevator frame 300, an elevator drive motor 304 attached to the elevator frame 300 and configured to selectively operate the elevator drive 302, and an elevator drive output 306 attached to the elevator frame 300 and configured to be driven about an elevator drive output axis 308 by the elevator drive motor 304.

The elevator frame 300 may comprise any suitable structure for holding the associated parts. For example, the elevator frame 300 may comprise a welded assembly of sheet metal parts, or the like. In this example, the elevator frame 300 comprises an assembly of parts that form a tube-shaped elbow 310 with an open bottom end 312 in communication with the grain elevator 122 and an open front end 314 in communication with the boom assembly 118. Thus, the elbow 310 is configured to direct crop material from the grain elevator 122 towards the boom assembly 118. The elevator frame 300 also may include features such as a gear 316 to be acted upon by a drive (not shown) to pivot the elevator frame 300 between the stowed and operating positions, and so on.

The elevator drive 302 is a series of one or more mechanisms that are configured to drive the crop elevator 110. For example, the shown elevator drive 302 comprises a simple drive shaft, which rotates about a horizontal elevator drive output axis 308 (the drive output axis 308 extends into the sheet, as shown in the side view of FIG. 3). In other cases, the elevator drive 302 may comprise a vertical drive shaft (e.g., to operate an auger), or other mechanisms.

The elevator drive motor 304 may comprise any suitable mechanism for powering the elevator drive 302. For example, the elevator drive motor 304 may comprise a hydraulic or electric motor. The elevator drive motor 304 is mounted to the elevator frame 300. Thus, as the unloader system pivots about the vertical pivot axis as shown in FIGS. 2A and 2B, the drive motor 304 can continue driving the elevator drive output 306 about the horizontal elevator drive axis 308. This allows continued operation as the unloader system pivots between the stowed position and unloading position.

The elevator drive output 306 comprises a power transmission mechanism, such as a gear, a sprocket, or a flat or grooved pulley. In this case, a pulley is shown, but it schematically represents the gear and sprocket alternatives.

The elevator drive 302 and elevator drive output 306 are configured to be driven by the elevator drive motor 304. In this case, the elevator drive 302 is connected at one end directly to the elevator drive motor 304, and at the other end directly to the elevator drive output 306. Thus, all three components rotate in unison at a 1:1 ratio. In this case, all three components also rotate about the same horizontal elevator drive output axis 308 (which extends into the page as shown in the side view of FIG. 3). In other cases, one or transmissions may be interposed between the components. For example, a reduction gear might be added between the elevator drive motor 304 and the elevator drive 302. As another example, if the elevator drive 302 is oriented to rotate a vertical-axis auger 122, a 90-degree transfer gear may be provided between the elevator drive 302 and the elevator drive output 306. As yet another example, the elevator drive motor 304 may be attached directly to the elevator drive output 306, and the elevator drive output 306 may be attached to the elevator drive 302 by a transmission. Other alternatives and variations will be apparent to persons of ordinary skill in the art in view of the present disclosure.

The boom assembly 118 generally includes a boom frame 318 and an unloader drive input 320. The unloader drive input 320 is attached to the boom frame 318 and configured to rotate about an unloader drive input axis 322. The boom assembly 118 may also be provided with an unloader conveyor belt 124, such as a lugged belt or the like. The boom assembly 118 also may include a chute (not shown in FIG. 3) and other features.

The boom frame 318 is pivotally connected to the elevator frame 300 at a boom pivot axis 324, which is formed by a pin or the like. The unloader drive input axis 322 and boom pivot axis 324 are generally parallel with the elevator drive output axis 308. The boom assembly 118 is pivotable about the boom pivot axis 324, relative to the elevator frame 300, through an angular range of motion θ between a first angular position (solid lines) and a second angular position (broken lines). This motion allows the boom outlet 120 to be raised or lowered (either actively by a powered drive, or passively by means of external forces), depending on the unloading conditions.

The unloader drive input 320 is operatively connected to drive the unloader conveyor belt 124. Thus, rotating the unloader drive input 320 about the unloader drive input axis 322 operates the unloader conveyor belt 124 to move crop material from the elevator assembly towards the boom assembly outlet 120. For example, the unloader drive input 320 may be connected to a spindle or drum about which the unloader conveyor belt 124 is wrapped, or is may be connected to such a spindle or drum by a transmission (e.g., gears, belts or chains).

Power is provided to the unloader drive input 320 by an endless flexible drive 326, such as a chain or belt. The endless flexible drive 326 is operatively connected between the elevator drive output 306 and the unloader drive input 320. In the shown example, the endless flexible drive 326 comprises a belt (e.g., a ribbed belt, V-belt, cogged belt, or the like), but the illustrated example also schematically illustrates alternative devices, such as a chain. The elevator drive output 306 and unloader drive input 320 thus are both selected to be transfer torque via the endless flexible drive 326, and preferably are the same type of mechanism (e.g., both pulleys, both sprockets, etc.). However, it is possible for the elevator drive output 306 to differ from the unloader drive input 320 (e.g., one being a grooved pulley and the other being a flat or crowned pulley).

Figure 4A:
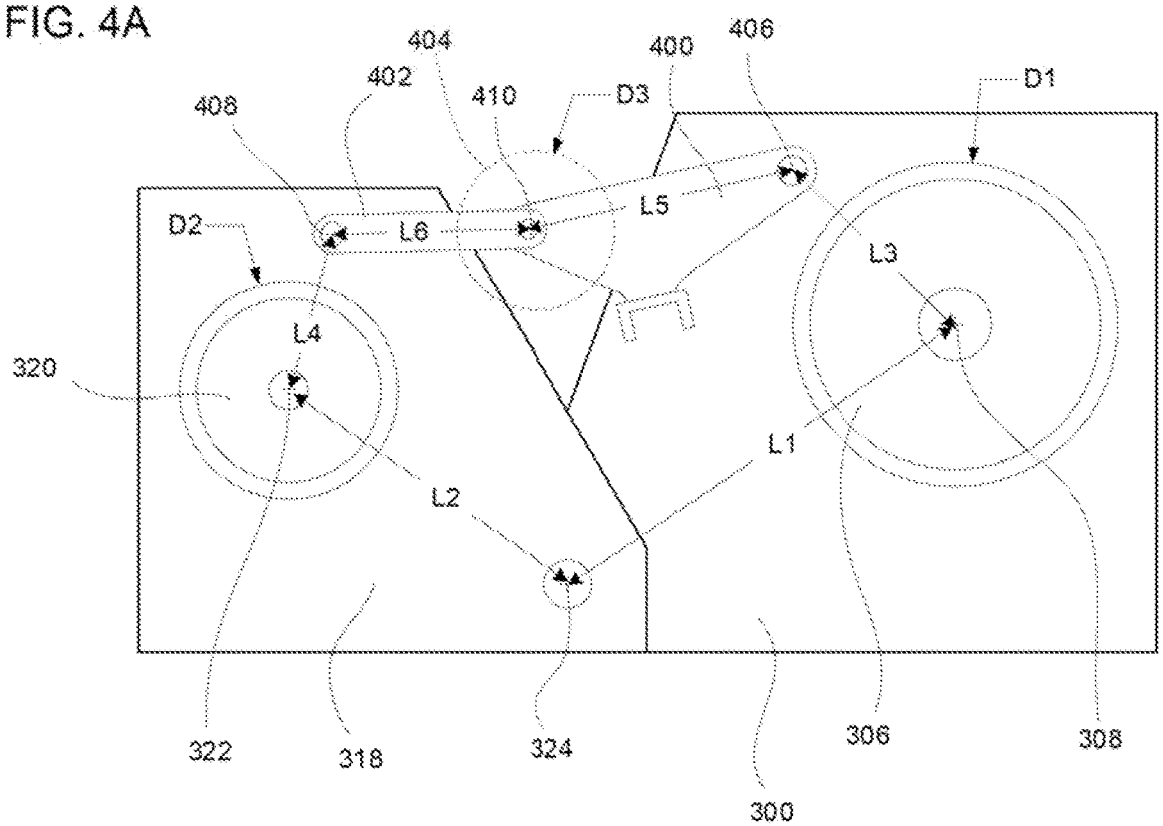
FIGS. 4A and 4B show the crop unloader system of FIG. 3 in two operating positions, with certain parts removed for clarity.
Figure 4B:
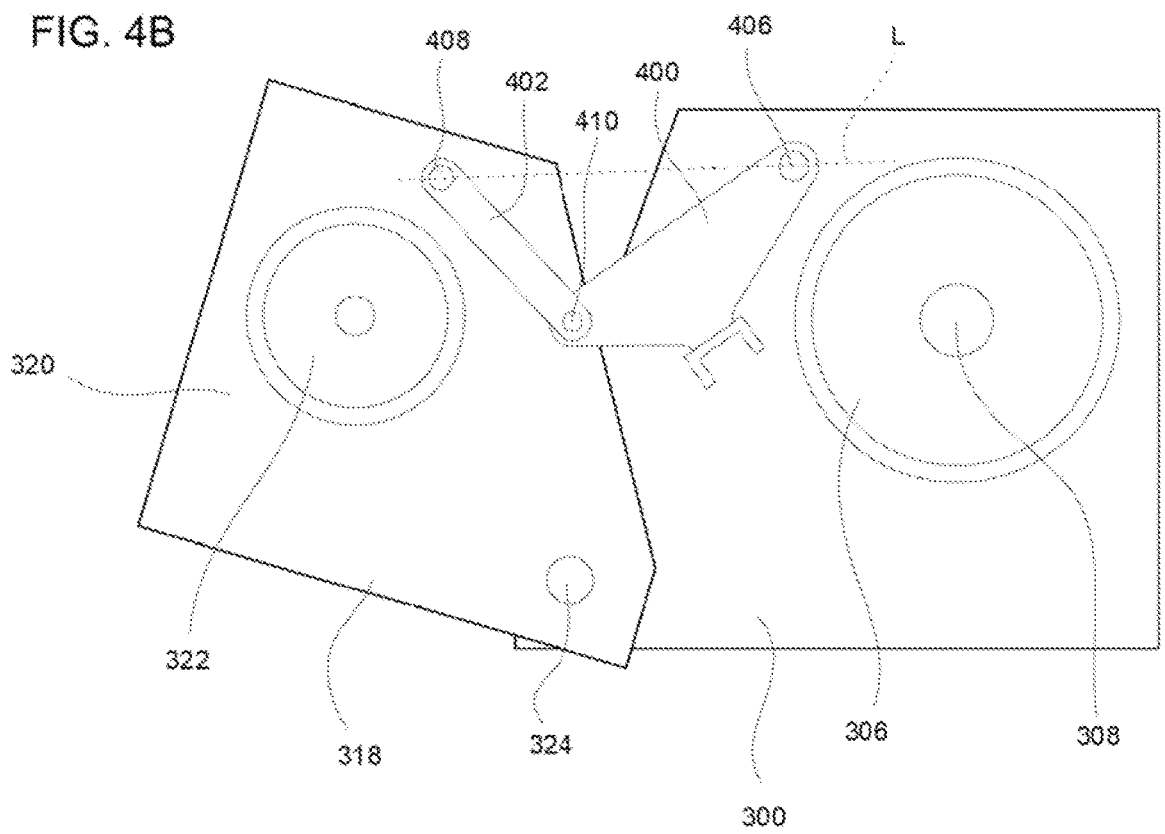
Figure 5A:
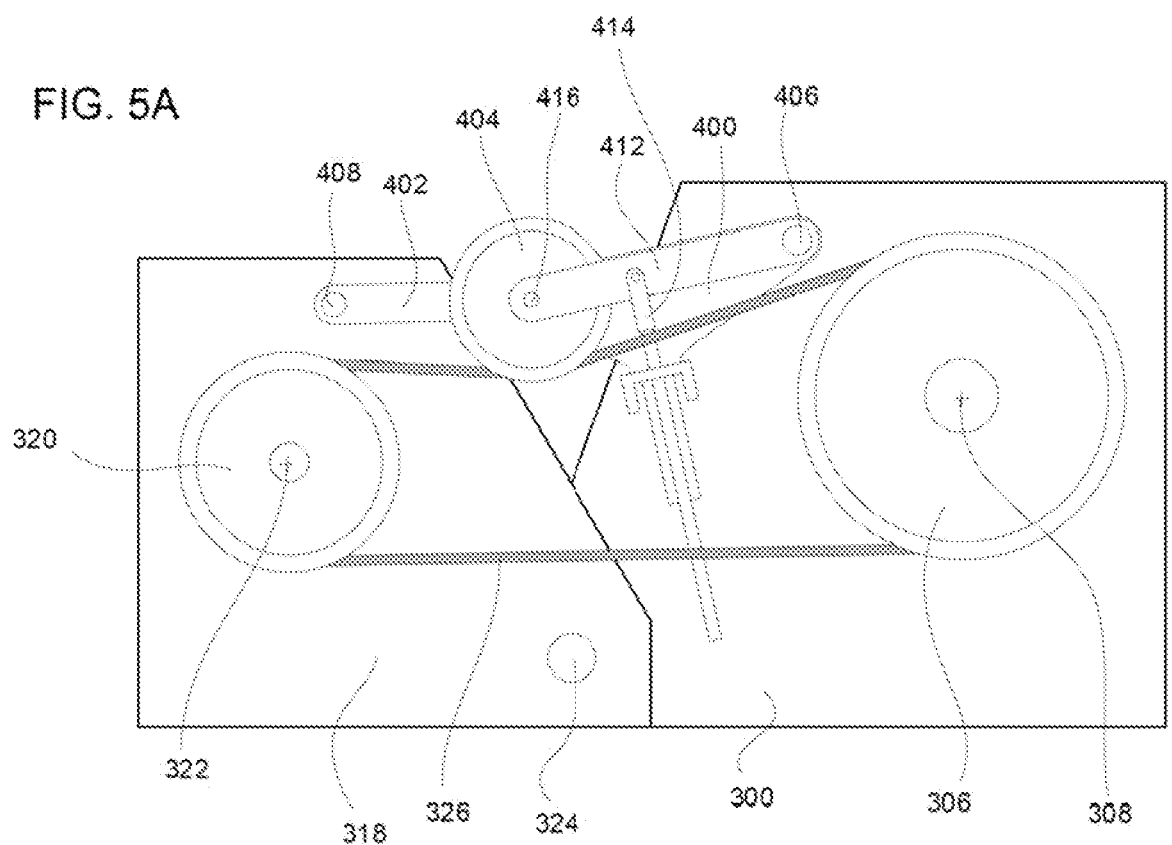
FIGS. 5A and 5B show the crop unloader system of FIG. 3 in two operating positions.
Figure 5B:
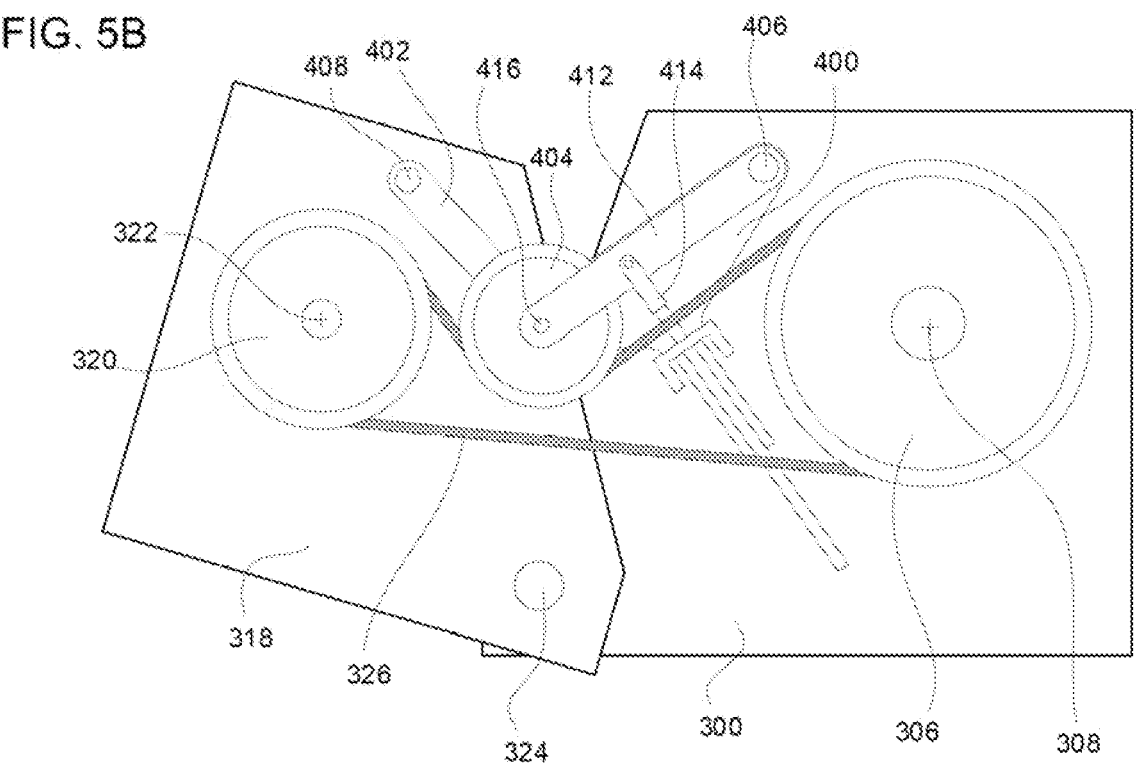

Reference is now also made to FIGS. 4A-5B. FIGS. 4A and 4B show the crop unloader system with the certain parts removed to show underlying parts in more detail. FIGS. 5A and 5B show the same, but with the parts removed from FIGS. 4A and 4B in place. The crop unloader system also includes a tensioning assembly that is configured to maintain tension in the endless flexible drive 326 throughout the range of motion θ. The tensioning assembly generally includes a tensioner link 400, a control link 402 and an idler wheel 404. The tensioner link 400 is pivotally connected to the elevator frame 300 at a first tensioner pivot 406, and the control link 402 is pivotally connected to the boom frame 318 at a second tensioner pivot 408. The control link 402 is pivotally connected to the tensioner link 400 at a third tensioner pivot 410. The tensioner link 400 and control link 402 preferably are rigid links (i.e., their lengths between pivots remain fixed during use), but they may include means to adjust their overall length during adjustment or maintenance.

The first, second and third tensioner pivots 406, 408, 410 may comprise any rotatable joint (e.g., pins or the like), and they are all rotatable about respective rotation axes that are generally parallel both to teach other, and to the boom pivot axis 324. The first, second and third tensioner pivots 406, 408, 410 and boom pivot axis 324 are also spaced from each other in directions perpendicular to their respective rotation axes (i.e., they are not collinear). Thus, a four-bar linkage is created by: the portion of the elevator frame between the boom pivot axis 324 and the first tensioner pivot 406; the portion of the boom frame 318 between the boom pivot axis 324 and the second tensioner pivot 308; the tensioner link 400; and the control link 402.

It will be appreciated that the connections of the tensioner link 400 and control link 402 may be reversed, with the tensioner link 400 being connected to the boom frame 318 at the first tensioner pivot 406, and the control link 402 being connected to the elevator frame 300 at the second tensioner pivot 408.

The idler wheel 404 is connected to the tensioner link 400 and configured to generate a tension load on the endless flexible drive 326. The idler wheel 404 may be fixed directly to the tensioner link 400, such as by being pinned to the tensioner link on a pivot, in which case the tension on the endless flexible drive 326 may be set by adjusting the length of one or both of the tensioner link 400 and the control link 402. Alternatively, the idler wheel 404 is mounted on the tensioner link 400 such that the position of the idler wheel 404 relative to the tensioner link 400 can be adjusted. For example, in the shown embodiment, the idler wheel 404 is connected to the tensioner link 400 by an idler arm 412 and a tensioning screw 414. The idler arm 412 is pivotally connected at one end to the tensioner link 400 (e.g., by mounting the idler arm 412 on the first tensioner pivot 406, or at another location along the tensioner link 400), and pivotally connected to the idler wheel 404 at the other end by a idler wheel pivot 416 (see FIG. 5A) to allow free rotation of the idler wheel 404 relative to the idler arm 412. The tensioning screw 414 is attached between the tensioner link 400 and the idler arm, at locations offset from the pivotal connection of the idler arm 412 to the tensioner link 400. Thus, a three-bar linkage is formed by the idler arm 412, tensioner link 400 and tensioning screw 414. The angular position of the idler arm 412 relative to the tensioner link 400—and thus the positon of the idler wheel 404 relative to the tensioner link 400—is changed by adjusting the length of the tensioning screw 414. Such adjustment alters the tension preload on the endless flexible drive 326.

The tensioning screw 414 may comprise any adjustable-length link, such as a threaded rod that is secured by a clevis to the idler arm 412, and to the tensioner link by threaded nuts. As another example, the tensioning screw 414 may comprise a turnbuckle that is pivotally connected at each end to the idler arm 412 and provided with a central cuff that can be rotated to alter the overall length. Other embodiments may use actively adjustable mechanisms (e.g., pneumatic or hydraulic telescoping connectors) or other mechanisms. The tensioning screw 414 also may be replaced by a spring or other resilient member that biases the idler wheel 404 against the endless flexible drive 326, but does not necessarily fix the position of the idler wheel 404 relative to the tensioner link 400. Other alternatives and variations will be apparent to persons of ordinary skill in the art in view of the present disclosure.

The positions and dimensions of the various parts can be selected to maintain the desired tension load on the endless flexible drive 326 (i.e., keep the tension load within a range of desired or acceptable values) throughout the entire range of motion θ of the boom frame 318 relative to the elevator frame 300. Variables that affect the tension as a function of angular position include, for example: the relative positions of the drive output axis 308, unloader drive input axis 322, boom pivot axis 324, and first, second and third tensioner pivots 406, 408, 410; the diameters of the elevator drive output 306, unloader drive input 320, and idler wheel 404; and the position of the idler wheel rotation axis relative to the tensioner link 400. By way of example, the embodiment shown in FIG. 4A (which is illustrated to scale) has the following relative dimensions, with the diameter D1 of the elevator drive output 306 being selected as the unit value:

TABLE 1

| Description | Reference Sign | Dimension |
| --- | --- | --- |
| Diameter of 306 | D1 | 1.000 |
| Diameter of 320 | D2 | 0.682 |
| Diameter of 404 | D3 | 0.477 |
| Distance from 308 to 324 | L1 | 1.432 |
| Distance from 322 to 324 | L2 | 1.045 |
| Distance from 308 to 406 | L3 | 0.704 |
| Distance from 322 to 408 | L4 | 0.477 |
| Distance from 406 to 410 | L5 | 0.818 |
| Distance from 408 to 410 | L6 | 0.590 |

In the example of FIGS. 4A and 4B, the idler wheel 404 rotation axis is essentially collinear with the third tensioner pivot 410, and so there is no need to take into consideration the idler wheel's position relative to the tensioner link 400. However, if the idler wheel 404 is displaced from this position, it's effect on the tension as a function of angular position can be determined using conventional geometric principles.

It will be understood that the relative dimensions provided herein are only one example of an embodiment, and other embodiments may include other dimensions as may be desirable to accommodate different circumstances. Such variations will be within the understanding of the person of ordinary skill in the art in view of the present disclosure, and other variations can be achieved without undue experimentation.

Referring now to FIG. 4B (which is selected simply for clarity of illustration), it is preferred that the first tensioner pivot 406, second tensioner pivot 408 and third tensioner pivot 410 are arranged such that the linkage formed by the tensioner link 400 and the control link 402 cannot invert as the boom assembly 118 moves through the range of motion θ relative to the elevator assembly 116. If such inversion were to happen, the idler wheel 404 could travel opposite to the intended direction. To this end, the third tensioner pivot 410 is positioned such that it remains on one side of a line L intersecting the first tensioner pivot 406 and the second tensioner pivot 408, throughout the range of motion of the boom frame 318 relative to the elevator frame 300. In the case of FIGS. 3A-5B, the third tensioner pivot 410 remains between the boom pivot axis 324 and the line L intersecting the first tensioner pivot 406 and the second tensioner pivot 408, throughout the range of motion θ of the boom frame 318 relative to the elevator frame 300.

Figure 6A:
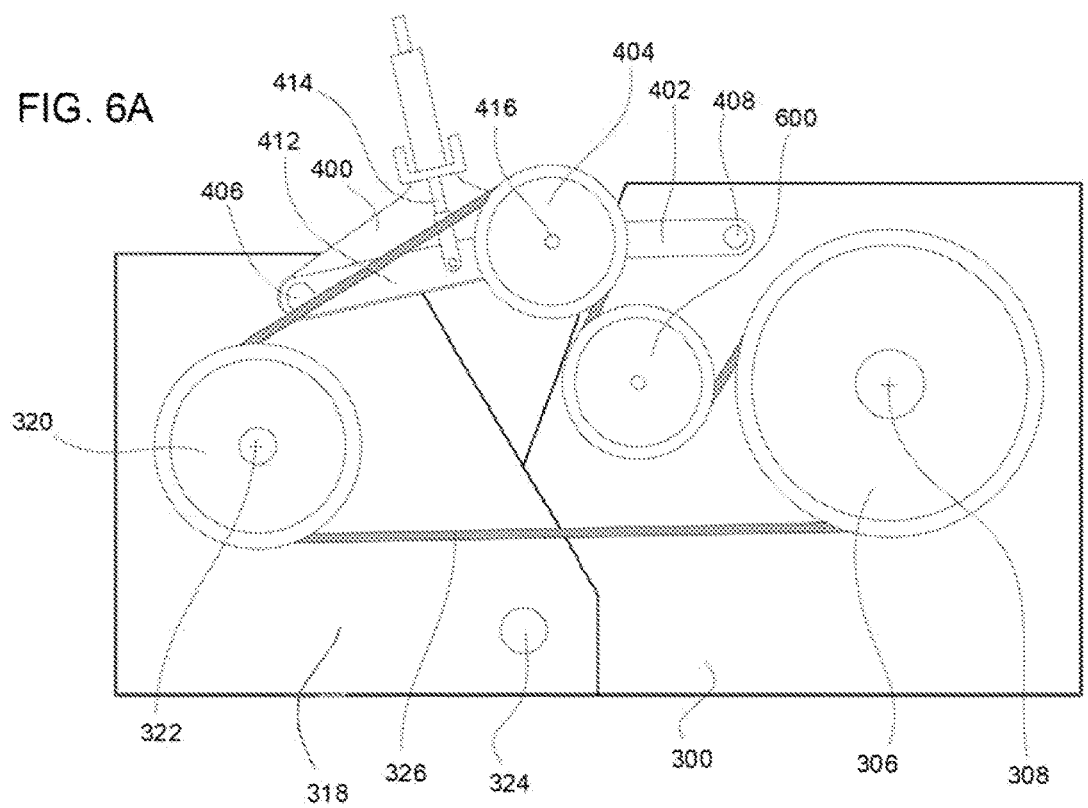
FIGS. 6A and 6B show another example of a crop unloader system of FIG. 3 in two operating positions.
Figure 6B:
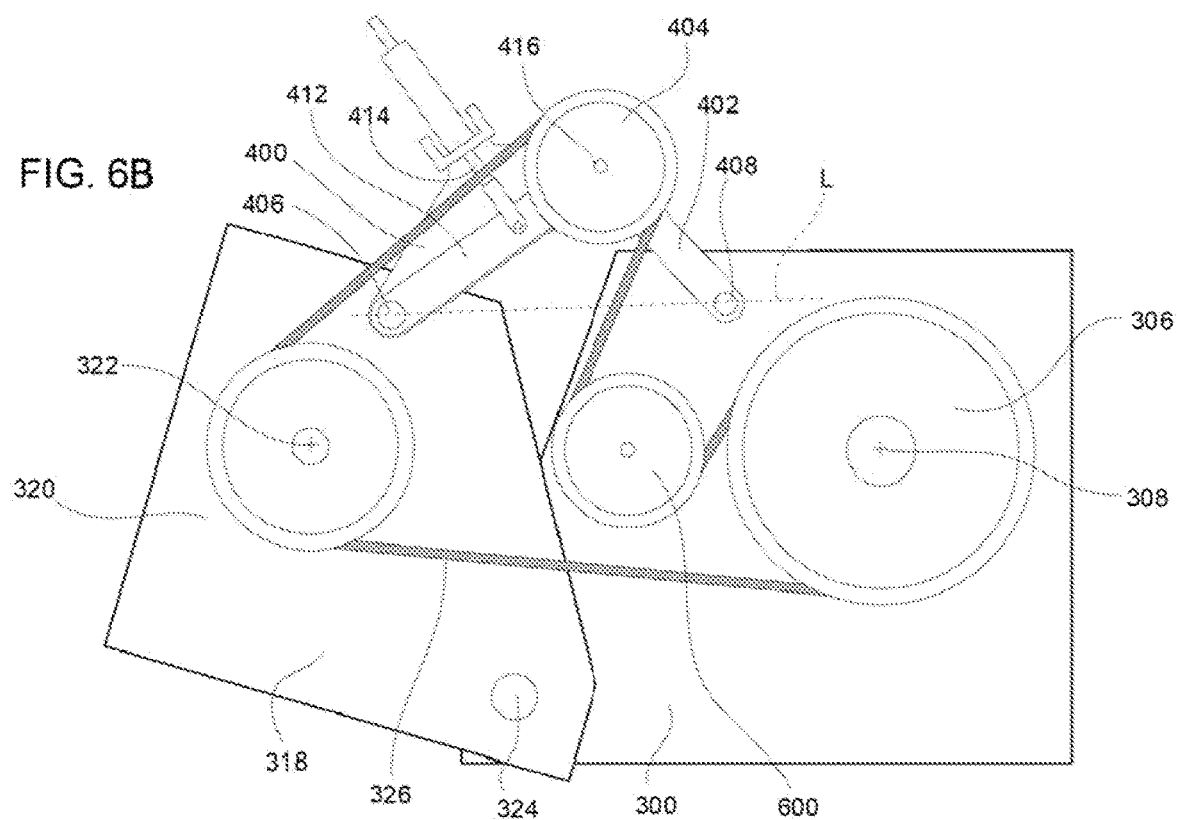

FIGS. 6A and 6B show another embodiment, in which the tensioning assembly has been reversed and inverted. The parts are generally the same as those described in the embodiment of FIGS. 3-5B, so only the differences are discussed herein. First, the tensioning assembly is reversed by locating the first tensioner pivot 406 on the boom frame 318, and the second tensioner pivot 408 on the elevator frame 300. Second, the tensioning assembly is inverted by positioning the third tensioner pivot 410 such that the line L intersecting the first tensioner pivot 406 and the second tensioner pivot 408 remains between the third tensioner pivot 410 and the boom pivot axis 324, throughout the range of motion θ of the boom frame 318 relative to the elevator frame 300. In this case, the tensioning assembly also may include one or more additional idler wheels 600 rotatably fixed to the elevator frame 300 and/or boom frame 318, which help maintain the endless flexible drive 326 in a favorable relationship relative to the elevator drive output 306 and the unloader drive input 320 (e.g., such that the endless flexible drive 326 wraps around a greater portion of the elevator drive output 306 or the unloader drive input 320 to improve torque transfer). Other alternatives and variations will be apparent to persons of ordinary skill in the art in view of the present disclosure.

Figure 7:
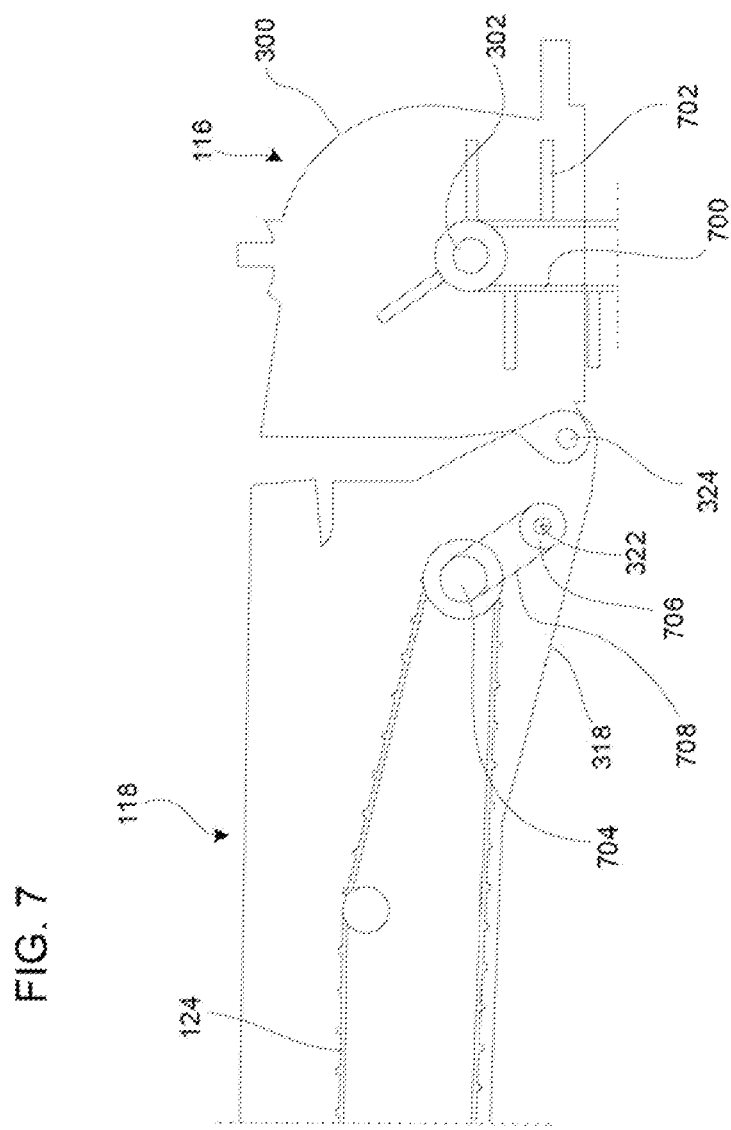
FIG. 7 is a side view of another example of a crop unloader system, showing internal components thereof.

FIG. 7 illustrates internal operating parts of a crop unloader system. Specifically, a grain elevator is shown in the form of an endless flexible drive 700 (belt, chain, etc.) having paddles 702 extending from it. The endless flexible drive 700 wraps around the elevator drive 302, with the paddles 702 facing outward. Operating the elevator drive 302 causes the endless flexible drive 700 and paddles 702 to move, thus carrying crop material upwards and delivering it from the elevator assembly 116 to the boom assembly 118. Inside the boom assembly, the unloader conveyor belt 124 is driven by a belt drive 704, which is driven by an unloader drive 706 that transmits power to the belt drive 704 via a chain or belt 708, or some other form of power transmission (e.g., gears). The unloader drive 706 is operatively connected to the unloader drive input 320 (not shown), such as by being mounted to rotate with the unloader drive input 320 about the unloader drive input axis 322. Power is provided from the elevator drive 302 to the unloader drive input 320 via mechanisms such as explained above. Other embodiments may have other arrangements of internal operating parts. For example, the belt drive 704 may be mounted to rotate about with the unloader drive input 320 about the unloader drive input axis 322. Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

The invention claimed is:

1. A crop unloader system comprising:
an elevator assembly comprising:
an elevator frame,
an elevator drive attached to the elevator frame,
an elevator drive motor attached to the elevator frame and configured to selectively operate the elevator drive, and
an elevator drive output attached to the elevator frame and configured to be driven about an elevator drive output axis by the elevator drive motor;
a boom assembly comprising:
a boom frame connected to the elevator frame at a boom pivot axis that is parallel with the elevator drive output axis, the boom frame being rotatable about the boom pivot axis relative to the elevator frame through a range of motion between a first angular position and a second angular position, and
an unloader drive input attached to the boom frame and configured to rotate about an unloader drive input axis;
an endless flexible drive operatively connected between the elevator drive output and the unloader drive input; and
a tensioning assembly comprising:
a tensioner link pivotally connected to one of the elevator frame and the boom frame at a first tensioner pivot,
a control link pivotally connected to the other of the elevator frame and the boom frame at a second tensioner pivot, and pivotally connected to the tensioner link at a third tensioner pivot, the third tensioner pivot being spaced from the first tensioner pivot and the second tensioner pivot,
an idler wheel operatively connected to the tensioner link, and configured to generate a tension load on the endless flexible drive,
wherein the tensioning assembly is configured to maintain the tension load on the endless flexible drive within a predetermined range, throughout the range of motion of the boom frame relative to the elevator frame.

2. The crop unloader system of claim 1, wherein the elevator assembly further comprises a grain elevator configured to be driven by the elevator drive.

3. The crop unloader system of claim 2, wherein the grain elevator comprises a plurality of paddles mounted on an endless paddle conveyor belt.

4. The crop unloader system of claim 2, wherein the grain elevator comprises an auger.

5. The crop unloader system of claim 1, wherein the elevator frame comprises a tube-shaped elbow configured to direct crop material from the elevator assembly to the boom assembly.

6. The crop unloader system of claim 1, wherein the elevator frame is configured to be rotatable about a vertical elevator axis that is perpendicular to the elevator drive output axis.

7. The crop unloader system of claim 1, wherein each of the elevator drive output and the unloader drive input comprises a respective pulley or a respective sprocket.

8. The crop unloader system of claim 1, wherein the elevator assembly further comprises an unloader conveyor belt operatively connected to the unloader drive input.

9. The crop unloader system of claim 8, wherein the elevator assembly further comprises an unloader belt chute surrounding the unloader conveyor belt.

10. The crop unloader system of claim 1, wherein the endless flexible drive comprises a belt.

11. The crop unloader system of claim 1, wherein the endless flexible drive comprises a chain.

12. The crop unloader system of claim 1, wherein the idler wheel is operatively connected to the tensioner link by an idler arm, the idler arm being pivotally connected at a first end to the tensioner link, and pivotally connected at a second end to the idler wheel.

13. The crop unloader system of claim 12, wherein the tensioning assembly further comprises a tensioning screw attached between the idler arm and the tensioner link and configured to control a positon of the idler wheel relative to the tensioner link.

14. The crop unloader system of claim 12, wherein the idler arm is pivotally connected at the first end to the tensioner link at the first tensioner pivot.

15. The crop unloader system of claim 1, wherein the third tensioner pivot is located on one side of a line intersecting the first tensioner pivot and the second tensioner pivot throughout the range of motion of the boom frame relative to the elevator frame.

16. The crop unloader system of claim 15, wherein the third tensioner pivot is located between the line and the boom pivot axis throughout the range of motion of the boom frame relative to the elevator frame.

17. The crop unloader system of claim 15, wherein the line is located between the third tensioner pivot and the boom pivot axis throughout the range of motion of the boom frame relative to the elevator frame.

18. An agricultural combine comprising:
a chassis configured for movement on a surface;
a threshing and separating system attached to the chassis;
a hopper located on the chassis and configured to retain crop material therein; and
A crop unloader system comprising:
an elevator assembly comprising:
an elevator frame,
an elevator drive attached to the elevator frame,
an elevator drive motor attached to the elevator frame and configured to selectively operate the elevator drive,
an elevator drive output attached to the elevator frame and configured to be driven about an elevator drive output axis by the elevator drive motor, and
a grain elevator configured to be driven by the elevator drive;
a boom assembly comprising:
a boom frame connected to the elevator frame at a boom pivot axis that is parallel with the elevator drive output axis, the boom frame being rotatable about the boom pivot axis relative to the elevator frame through a range of motion between a first angular position and a second angular position,
an unloader drive input attached to the boom frame and configured to rotate about an unloader drive input axis,
an unloader conveyor belt operatively connected to the unloader drive input, and an unloader belt chute surrounding the unloader conveyor belt;
an endless flexible drive operatively connected between the elevator drive output and the unloader drive input; and
a tensioning assembly comprising:
a tensioner link pivotally connected to one of the elevator frame and the boom frame at a first tensioner pivot,
a control link pivotally connected to the other of the elevator frame and the boom frame at a second tensioner pivot, and pivotally connected to the tensioner link at a third tensioner pivot, the third tensioner pivot being spaced from the first tensioner pivot and the second tensioner pivot,
an idler wheel operatively connected to the tensioner link, and configured to generate a tension load on the endless flexible drive,
wherein the tensioning assembly is configured to maintain the tension load on the endless flexible drive within a predetermined range, throughout the range of motion of the boom frame relative to the elevator frame.

* * * * *